United States Patent [19]

Poznański et al.

[11] 4,209,534
[45] Jun. 24, 1980

[54] METHOD OF PRODUCTION OF THERMOSTABLE TEXTURED MILK PROTEIN PRODUCT RESEMBLING BEEF

[75] Inventors: Stefan Poznański; Zbigniew Śmietana; Henryk Stypułkowski; Jan Janicki; Jerzy Szpendowski; Zenon Szewczyk, all of Olsztyn, Poland

[73] Assignee: Akademia Rolniczo-Techniczna, Olsztyn, Poland

[21] Appl. No.: 891,493

[22] Filed: Mar. 29, 1978

[30] Foreign Application Priority Data

Mar. 31, 1977 [PL] Poland .................................. 197104

[51] Int. Cl.² ................................. A23C 9/12
[52] U.S. Cl. ....................... 426/42; 426/302; 426/388; 426/455; 426/506; 426/516; 426/517; 426/540; 426/580; 426/585; 426/656; 426/802
[58] Field of Search ................. 426/104, 802, 580, 42, 426/34, 39, 585, 582, 654, 657, 533, 540, 656, 662, 388, 456, 506, 516, 517, 519, 520, 522, 444, 518, 302, 455

[56] References Cited

U.S. PATENT DOCUMENTS

| | | | |
|---|---|---|---|
| 3,172,767 | 3/1965 | Foster et al. ............................ | 426/39 |
| 3,378,375 | 4/1968 | Little ..................... | 426/582 |
| 3,531,297 | 9/1970 | Kielsmeier et al. ................... | 426/582 |
| 3,674,500 | 7/1972 | Nagasawa et al. .................... | 426/802 |
| 3,889,004 | 6/1975 | Schmidt et al. ....................... | 426/582 |
| 3,961,077 | 6/1976 | Kielsmeier et al. ................... | 426/582 |
| 4,021,584 | 5/1977 | Rankowitz ............................. | 426/802 |

*Primary Examiner*—S. Leon Bashore
*Assistant Examiner*—Peter Chin
*Attorney, Agent, or Firm*—Haseltine, Lake & Waters

[57] ABSTRACT

The method of production of thermostable textured milk proteins of whole milk, partially skimmed milk, or skimmed milk subject to low temperature pasteurization, or to high temperature pasteurization of short duration, with the addition of calcium salts, or calcium and calcium-phosphate salts, is characterized in that 5–25% by volume of the milk to be processed is cooled and emulsified with animal or vegetable fats, or a mixture thereof, with the addition of emulsifiers permitted for food, the obtained mixture is homogenized and added to the remaining portion amounting to 75–95% by volume of the milk to be processed, cooled down, whereafter the whole is buffered, thus causing a partial decalcification of the particles of calcium phosphocaseinate, so as to maintain a level of calcium bound with the milk protein of 0.35–0.8 millimols per 1 g of protein, and admixed with food colors, whereafter all the casein and milk albumins are coagulated, and the coagulate is disintegrated and granulated together with serum, whereafter a preliminary texturing of the granulated pulp is carried out, followed by the full texturation thereof, by forcing it through a nozzle, and the obtained texturized milk protein are disintegrated in pieces of various sizes or formed into bodies of various shapes, and conditioned in water, repeatedly in a continuous system, and the finished milk protein are frozen or lyophilized, or delivered immediately to storage.

10 Claims, 1 Drawing Figure

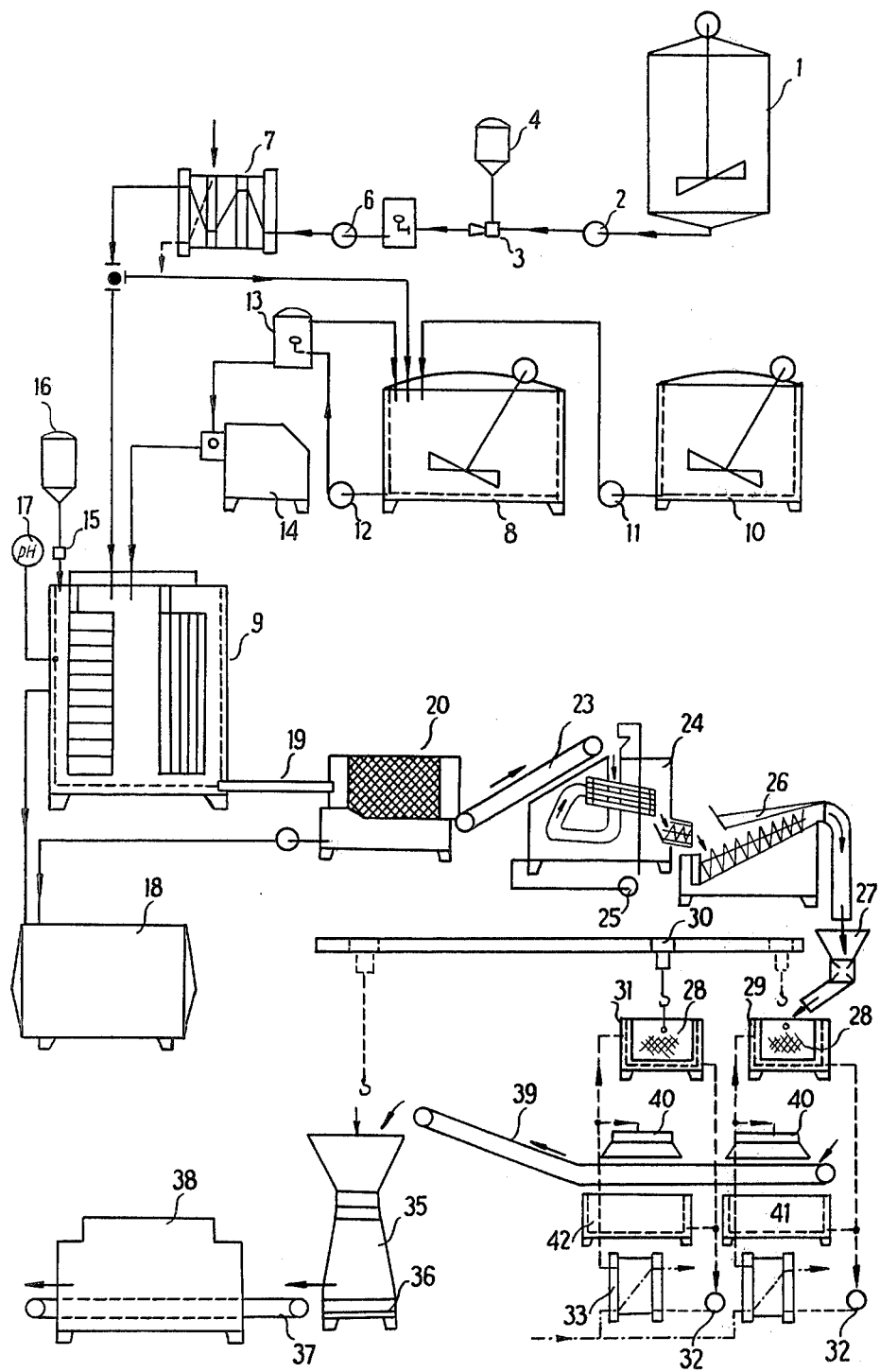

METHOD OF PRODUCTION OF THERMOSTABLE TEXTURED MILK PROTEIN PRODUCT RESEMBLING BEEF

This invention relates to a method of production of thermostable, and thus resistant to boiling, frying and sterilization, milk proteins having rheological properties and hydrogen ion concentration very close to those of beef proteins. These textured milk proteins constitute a high-grade raw material for the production of meat-like food products or are employed as additives for the production of traditional or new meat and fish preserves, delicatessen foods and the like. The textured milk proteins are not distinguishable from the meat components wherewith they form a uniform composition, with no signs of changes of the structure, color and taste, but with simultaneous increase of the nutritious value of the finished product.

Known methods for production of textured casein consist in dissolving at a high temperature the casein of milk being previously dried or highly dewatered in solutions of salts, bases and acids, so as to obtain a protein mixture of acid reaction. Such a process, besides involving high energy consumption, leads inevitably to, for a food product, undesirable partial destruction of scarce aminosulfuric acids and to an advanced denaturation of proteins, which decreases the nutritious value of textured milk proteins obtained in this way.

According to U.S. Pat. No. 3,674,500 in order to convert 1.19 kg casein with a water content of 12% into a homogeneous solution 0.715 kg $K_2PO_4$ (10% in relation to the weight of casein) and 0.285 kg of calcium hydroxide are added and the mixture having a strong alkaline reaction—pH 11.6—is kept at a temperature of 90° C., whereafter using a solution of hydrochloric acid the mixture is neutralized to pH 6.8.

According to French Pat. 2,090,571 1.5 g dried casein is emulsified with 4 g of sodium alginate and 500 ml of 10% solution of a calcium acetate, and the mixture is kept for 6 hours to complete dissolving of the components, whereafter the solution is subjected to spinning, and fixed in a solution of binding agent at a temperature of 100° C.

According to French Patent 2,090,572, 100 g of casein are emulsified in 10 g of sodium alginate, 25 g of sodium chloride, in a solution of sodium hydroxide, solution of calcium acetate and solution of aluminum acetate, and the centrifuged fibers are fixed at a temperature of 60° C. in a 1% solution of potash alum and washed in a 4% solution of sodium chloride.

Another method of production of textured milk proteins is known from Polish Pat. application No. P.-186148, consisting in thermal plasticization of casein. Therefor, to raw or pasteurized bottom milk or to bottom milk with addition of fat previously homogenized in a solution of concentrate of soluble milk proteins food color are introduced in the form of a solution, and the mixture is enriched with vitamins of the B group occurring in beef.

From the milk combined with fat and color casein is coagulated enzymatically and acidified in the stream of whey with a solution of an organic acid to obtain a pH value of 6.0–4.5. After a predetermined time the protein mass is isolated from the whey and elasticized by immersing in an aqueous solution acidified to a pH value of 6.0–4.5 at a temperature of 50°–100° C. for 1–5 minutes. Then the elasticized mass is restructurized manually or mechanically by squeezing and stretching, whereafter it is disintegrated and washed with water at room temperature. The obtained protein mass is fixed in one of the hardening baths:- solution of calcium chloride and sodium chloride, solution of calcium chloride and calcium lactate, solution of calcium chloride and hydrochloric acid, having a concentration of 3–30% in the course of 5 minutes to 24 hours at a temperature of 5°–120° C.

The fixed milk proteins are washed repeatedly in water and introduced into a taste-flavor bath and kept therein for 2–72 hours at a temperature of 2°–20° C. The obtained textured milk proteins are able to be immediately used for meat products, or they are dried or frozen and stored till the moment of their use.

In the method according to the invention whole milk is employed, part-skim-milk or skim-milk enriched with calcium salts and calcium-phosphate salts. Said milk is subjected to high temperature pasteurization of short duration at a temperature of 90°–92° C. for 15–30 seconds, or without the addition of the named salts—to a low temperature pasteurization at a temperature of 72°–78° C. for 15–30 seconds. From the milk prepared in this way 75–95% of the entire volume to be processed is separated and after being cooled is supplied immediately to the reaction tank, whereas the remaining milk in the amount of 5–25% by volume is cooled down preferably to a temperature of 40°–70° C. and then emulsified with animal fat, such as lard, beef tallow, poultry lard, or with a vegetable fat, such as soybean oil, palm oil, coconut oil, sunflower oil, or a mixture thereof preferably in the amount of 0.5–3% by volume in relation to the total amount of milk to be processed, with addition of emulsifiers acceptable for food products, such as monoglyceride concentrate or vegetable phospholipides, preferably soybean lecithin, in amounts ensuring the emulsification of the fat being added to the milk, and retaining of the fat in the protein pulp in the course of further processing. The emulsification of the fat suspension in milk is carried out by intensive agitation at a temperature of 40°–70° C. and by subsequent squeezing through a slot in the homogenizer head under a pressure of 100–170 atm. The milk with dispersed fat is delivered to the reaction tank containing the remaining amount of the processed milk. Thereafter the milk with the emulsified fat suspension is buffered by an addition of a biological solution of lactic, or citric, or edible acetic acid, or hydrochloric, or phosphoric acid, till partial decalcification of particles of calcium phosphocaseinate in order to maintain the level of calcium bound with the milk proteins at 0.35–0.8 mmol/g of proteins, in compliance with the desired rheological properties of textured milk proteins. Then food colors are added, as for instance cochineal from coccus cacti, alcanet from auchusa tinctoria, cocoa red from cocoa beans, lac from coccus lacca, orchil licheus, annato from bixa orellana, orange yellow S, tartrazine S, amaranth I, new kocein, cochineal red A, indigotine, caramel, onion skin extract, preferably caramel, onion skin extract, orange yellow S and cochineal red, as well as mixtures thereof.

To the milk prepared in this way or to the milk combined with fat enzymes are introduced, substances which coagulate the milk proteins, as for example rennet, pepsin or hydrolases of microbiological origin in order to isolate the calcium paracaseinate or calcium paracaseinate combined with whey proteins, in the form of a coagulum. The coagulum of milk proteins is disintegrated and delivered, preferably gravitationally, to a rotational perforated apparatus wherein the pasteurization and granulation follow, as well as a reduction of the content of water within the limits of 70–80% by weight and of milk sugar down to a maximum 5% by weight, that is to a level which will not make it difficult to obtain the desired properties of the textured milk proteins. The preliminary texturation of the granulated pulp consists in thermal plasticization and twisting or vibrating of the pulp. The thermal plasticization of the pulp is carried out in an acidified aqueous solution at the pH value of a protein pulp of 5.6–6.2, and at a temperature of 60°–80° C. In order to increase the water absorbability of the finished product polyphosphates are introduced into the acidified aqueous solution in an amount of 0.01–0.8% by weight. The preliminarily textured pulp is subjected to principal texturation at a temperature of 40°–60° C., subsequently by squeezing it in a screw extruding press, forcing through a nozzle and stretching until the desired fibrous structure is obtained.

Into the preparation being textured preliminarily there are introduced:-

(a) complementing food colors to those specified above;

(b) flavoring substances:- kitchen salt, sodium glutamate, glutamic acid, monosodium glutamate, glucose, saccharose, sodium phosphate, sodium acid phosphate, sodium polyphosphates, sodium cyclophosphates, sodium citrate, sodium isocitrate, ascorbic acid, sodium isoascorbate, and aqueous infusion with the composition:- black or herb pepper, paprika, marjoram, caraway, coriander, white pepper, nutmeg-apple, laurel leaves, curry;

(c) polyphosphates, carrageens, pectins, modified starch;

(d) concentrates and isolates of vegetable proteins, concentrates of whey proteins, calcium proteinate, blood plasma prepared accordingly, collagen, plasteins, concentrates and isolates of proteins of microbiological origin;

(e) vitamin concentrates in amounts as present in meat, or higher.

The preparation of the textured milk proteins, disintegrated in pieces, is conditioned in aqueous solution at a pH value of 6.5–7.0, at a temperature of 14°–20° C., for 3–15 minutes, or in an aqueous solution of salt, with a content of kitchen salt of 2–10%, at a pH value of 6.5–7.0, at a temperature of 14°–20° C., and then in water at a temperature of 2°–6° C. During the course of conditioning there occurs a fixation of a fibrous structure resistant to thermal processes used in food processing technology, and cooling of the preparation. The finished textured milk proteins are then packed and delivered to the user or frozen in a freezing tunnel and stored at a temperature of −18° C., or without being frozen they are lyophilized or dried in a fluidized-solids vibrating drying plant.

After disintegration the textured milk proteins are passed continuously through a solution of a binding agent, as for instance through a solution of milk proteins, calcium proteinate, calcium-sodium proteinate, ovalbumin, or a mixture thereof. Textured proteins are stored in water at a temperature of 70°–95° C. and cooled down to a temperature of 2°–6° C., or frozen in a freezing tunnel, or lyophilized, or dried at a temperature of 100°–160° C., and directed to the storage or delivered to the buyer.

The substantial chemical composition of undried textured milk proteins obtained according to the invention is as follows:-

| water | 55–65 | % by weight |
|---|---|---|
| protein | 18–30 | % by weight |
| fat | 0.5–16 | % by weight |
| milk sugar | 0.5–2 | % by weight |
| natural mineral salts mainly of calcium and phosphorus | 1.5–3 | % by weight |

The hydrogen ion concentration corresponds with the pH value of beef that is of 5.9–6.1. The total number of microorganisms in 1 g not more than 50,000, and of yeast and mold not more than 100. Bacteria of the group of coli in 0.1 g are not permissible, bacilli of the group of salmonella and pathogenic staphylococci are not present.

The obtained textured milk proteins exhibit a high nutritious value of 3.2 PER (Protein Efficiency Ratio), whereas that of the products specified hereinbelow is of the order of:-

| casein | 2.6 PER |
|---|---|
| beef | 2.5 PER |
| textured casein - centrifuged | 2.3 PER |
| textured soyabean proteins - expanded | 2.2 PER |
| isolate of soya-bean protein | 1.9 PER |
| textured soya-bean proteins - centrifuged | 1.8 PER |
| concentrate of fish proteins | 1.8 PER |

The method according to the invention makes it possible to obtain textured milk proteins free of chemical modifications, having high microbiological quality and low—below the permissible limit—content of metals and undesired anions, and free from a high degree of denaturation, contrary to all known methods of texturizing the proteins by the spinning process, and even in the process of thermal plasticization, according whereto the obtained fibrous structure is fixed by several minutes' keeping the albumins in a 20% solution of calcium chloride or other salts at a temperature of 100° C.

Thermostable milk proteins having a fibrous structure and rheological properties approximating those of a meat tissue are obtained as a result of deralcification of milk proteins down to 0.45 mmol/1 g of protein before enzymatic isolation of coagulate, followed by thermoplastic squeezing and fibrating at an exactly determined active acidity.

The structurized properties of milk proteins are obtained according to the invention in three consecutive and complementing operations:- buffering of the milk proteins before an enzymatic coagulation of the protein pulp or of the protein-and-fat pulp, and in mechanical and thermal processing in order to give to the globular milk proteins a permanent fibrous structure without chemical fixation in solutions of inorganic salts.

A preliminarily textured protein pulp absorbs the flavoring and perfuming substances, thus eliminating thus the uneconomically time consuming and not fully hygienic, hour-long flavoring bath, and makes it possible to introduce natural color in determined amounts, with economical consumption thereof. That makes it possible to obtain textured milk proteins with various color intensities, suiting to the requirements of the buyer and taste of the consumer.

The method according to the invention now be described in detail by way of examples with reference to the accompanying drawing showing a diagrammatic flow-sheet of the process and apparatus used therein.

EXAMPLE 1

Skimmed raw milk stored in the tank 1 is pumped by the pump 2 through the injector 3 wherein the milk is mixed with a systematically proportioned solution of calcium salts from the tank 4, in an amount of 3.6 mmol/l of milk.

The milk enriched with calcium salts in the amount of 3.6 mmol of calcium chloride is delivered by the pump 2 to the surge tank 5, and then by the pump 6 to the plate-type exchanger 7 in order to pasteurize it at a temperature of 92° C. for 15 seconds. The pasteurized milk in an amount of 25% by volume flows to the tank 8, and the remaining 75% by volume flows to the reaction tank 9. Per each 1000 l of the milk to be processed, in the tank 10 15 kg of pork lard with the addition of 1% of lecithin, in relation to the amount of fat, are dissolved at a temperature of 55° C., and pumped over with the pump 11 to the tank 8, wherein the 25% by volume of the milk to be processed are stored, being heated up to a temperature of 60° C. and subjected to continuous and intensive agitation. The obtained mixture of milk and fat is delivered by the pump 12 to the surge tank 13, wherefrom it flows by gravity down to the homogenizer 14, where the whole is subjected to homogenization at a temperature of 55° C. under a pressure of 140 atm. The emulsion from the homogenizer 14 is delivered directly to the reaction tank 9 whereto simultaneously 75% by volume of the pasteurized milk to be processed are delivered. After filling the reaction tank 9 a mixture is heated up to a temperature of 35° C., whereafter 0.3% by volume of caramel and onion skin extract are added. By means of the feeder 15 the necessary amount of the solution of milk acid from the tank 16 is introduced to obtain the buffer capacity of the mixture of 12–14 ml of 0.1 N solution of soda lye consumed for changing the pH value of 100 ml of the mixture by 1 unit. After thorough mixing and elapse of about 10 minutes the content of calcium bound bounded with calcium phosphocaseinate reaches a value of 0.6 mmol/1 g of protein. The level of the buffer capacity and the level of increase of ionic calcium is determined by means of an ion meter or the pH-meter 17. The mixture of milk and fat prepared in this way is coagulated enzymatically, then disintegrated mechanically and the isolated serum in amount of 50% is discharged to the tank 18 over a valve installed at the half height of the reaction tank 9. The remaining protein pulp with serum is discharged by gravity through a closed conduit 19 to the rotational perforated granulator 20 wherein the serum is isolated with a content of 75% by weight of water, and 4.5% by weight of milk sugar.

The serum flows down to the intermediate tank 21 and is delivered by the pump 22 to the tank 18. The granulated protein pulp falls down onto the belt conveyor 23 which supplies the granulate to the preliminary texturator 24 wherein in the aqueous solution acidified to a pH value of 6.0, at a temperature of 70° C., with the addition of 0.4% by weight of polyphosphates, the thermal plasticization of the granulate occurs, with simultaneous mechanical twisting of the plasticized pulp. Into the obtained preparation there are introduced the food colors:- cochineal from coccus cacti, alkanet from auchusa tinctoria, orange yellow S, amaranth I; flavoring substances:- domestic salt, monosodium glutamate, sodium isocitrate, aqueous infusion of herbs, polyphosphates, whey protein concentrate, calcium proteinate and vitamin concentrates. Closed hot water circulation is provided by pump 25. The plasticized pulp falls down by gravity to the principal texturator 26 wherein it is first cooled down to a temperature of 55° C., and then forced and squeezed mechanically by a system of worms providing the obtaining of desired properties of textured proteins. The formed band of textured protein is sliced into cubes of the size 20×20 cm, and then with the powered disintegrator 27 disintegrated into pieces having the dimensions of 5×2 or 7×3 cm.

The disintegrated pieces fall down to the perforated bin 28 arranged in the tank 29. The tank 29 provided with thermal insulation and heater (not shown) is filled with an aqueous solution acidified to a pH value of 6.5, having a temperature of 16° C. The cooled textured protein together with the bin 28 is then delivered by means of the controlled hoist 30 to the next tank 31 filled with water having a temperature of 2° C. The tanks 29 and 31 are provided with suitable numbers of sections, the water being pumped in a closed cycle:- tank 31—pump 32–exchanger 33, and being periodically renewed and made-up. The temperature within the tanks 29 and 31, and the time of keeping the textured milk proteins in the bath are automatically controlled and monitored. The textured milk proteins are delivered by means of the conveyor 30 to the feeder 34 and packed in polystyrene bags 35, being weighed on conveying scales 36, or before packing they pass on the belt conveyor 37 to the freezing tunnel 38 where they are frozen to a temperature of below −18° C.

According to an alternative design the disintegrated textured milk proteins are led by means of the perforated belt conveyor 39 through the tunnel through a stream of water and gradually cooled down to a temperature of 14° C. and then to 4° C.

The water circulation occurs through the pumps 32, heat exchangers 33 and spray showers 40. From the perforated conveyor 39 the water flows down to the tanks 41 and 42 and is further delivered in closed cycle, and periodically renewed. The further process operations as packing or freezing and packing are carried out as specified before.

The textured milk proteins obtained according to the invention are resistant to temperatures of boiling, frying and sterilization. The method according to the invention makes it possible to produce a product with high physical-and-chemical quality, high microbiological quality and high biological value in one mechanized production line. The mechanized production line according to the invention makes it possible to obtain - directly from milk - a product having a fibrous structure, with low consumption of energy and labor.

EXAMPLE 2

Partially skimmed milk is enriched with calcium-phosphate salts an amount of 0.04% by volume and subjected to the process of pasteurization of short duration at a temperature of 90° C. for 15 seconds.

From the milk prepared in this way 95% of the whole processed volume is separated, and after cooling down to a temperature of 30° C. delivered immediately to the coagulation tank, the remaining 5% by volume, on being cooled down to a temperature of 70° C., being mixed with beef tallow molten at the temperature of 115° C. and cooled down to a temperature of 70° C. and with soya-bean oil. To the molten fat, phospholipides are added in an amount of 1% of the amount of fat. The amount of fat mixed with milk is 1% by volume in relation to the total volume of the milk to be processed. The mixture of milk with fat is emulsified by intensive agitation at a temperature of 70° C. for 30 seconds, and by homogenizing under a pressure of 170 atm. The milk with dispersed fat is combined with the remaining amount of milk in the coagulation tank and agitated mechanically for 3 minutes. To the milk with emulsified dispersion of fat a 5% aqueous solution of edible hydrochloric acid is added in such an amount as to decrease the pH value of the milk to 6.1 and to cause a partial decalcification of the particles of calcium phosphocaseinate to the level of calcium bound with protein of 0.75 mmol/1 g of protein. Thereafter, in order to provide a color of pickled meat, there are introduced:- caramel in an amount of 0.1% by volume, and cocoa red, annata from bixa orellana, tartrazin, cochineal red A, and orange yellow S in an amount of 0.5 g of each color per 1000 liters of milk. To the milk prepared in this way and heated or cooled to a temperature of 35° C. there is added a solution of rennet having a concentration of 1:100,000 in an amount of 30 g per each 1000 liters of milk to be processed. After 15–20 minutes the coagulate of milk proteins is obtained, being disintegrated and separated from the serum. The coagulate should contain 70% of water, which is obtained by decantation of the serum and a mechanical granulation of the coagulate. The granulated albumin-fat pulp in an aqueous carrier having a pH value of 6.2 is admixed with polyphosphates in an amount of 0.01% by weight, and is subjected to mechanical and thermal plasticization at a temperature of 80° C. Into the obtained preparation flavoring substances are introduced, such as sodium glutamate and sodium polyphosphate in an amount of 1% by volume, and blood plasma and isolates of vegetable proteins in an amount of the 10%, as well as vitamins of B-group in an amount of 1000 I.U. per 1000 g. The preliminarily textured protein-fat pulp is subjected to principal texturation by mechanical squeezing and forcing through a nozzle and stretching after cooling down to a temperature of 40° C. in order to impart for it a determined drawability necessary to forming the fibrous structure. The obtained band of textured proteins is disintegrated into pieces of the size of $1 \times 1 \times 1$ cm and immersed in water having a pH value of 7.0 and a temperature of 14° C., and having an addition of 10% by weight of NaCl, for 15 minutes in order to wash and fix the preparation. Then the preparation is immersed in a water bath having a temperature of 2° C., for 30 minutes, in order to cool it down, and after drying it is passed through the binding agent being a solution of calcium proteinate and sodium-calcium proteinate. The textured protein is kept in water at a temperature of 90° C., then cooled down to a temperature of 2° C. and finally packed.

EXAMPLE 3

Whole milk having a content of 3.0% of fat is pasteurized at a temperature of 78° C. for 15 s. Therefrom, 85% by volume of milk is cooled down to a temperature of 35° C. and delivered to the coagulation tank, the remaining 15% by volume of milk being cooled down to a temperature of 40° C. and emulsified with palm oil and sunflower oil. For each 1000 l of milk to be processed 5 kg of palm oil and sunflower oil are added, heated up to a temperature of 40° C., and 0.25 kg of monoglyceride concentrate. The whole is mixed and homogenized under a pressure of 100 atm. The prepared emulsion is introduced to the milk stored in the coagulation tank and admixed with food colors in an amount of 0.8% by volume, and namely with cochineal from coccus cacti, alkanet from auchusa tinctoria, and orange yellow. After thorough mixing the whole is buffered with a 10% solution of a mixture of citric acid and acetic acid to a pH value of the milk of 6.05, thus causing the decalcification of the calcium phosphocaseinate to the content of 0.45 mmol of calcium bound per 1 g of protein. The mixture prepared in this way is coagulated with pepsin, and the coagulate of protein with fat is isolated from serum to a content of 20% by weight of dry mass and of 3.5% by weight of lactose. In the partially dewatered preparation the granulated protein-fat pulp is subjected to plasticization at a pH value of the protein pulp of 5.6, at a temperature of 60° C., with the addition of polyphosphates in an amount of 0.8% by weight. Into the plasticized pulp caramel, onion skin extract, domestic salt, monosodium glutamate, ascorbic acid, an aqueous infusion of caraway, and a concentrate of whey proteins and collagen are added. After thorough mixing and cooling down to a temperature of 60° C. the pulp is supplied to the substantial texturator in order to form a fibrous structure of the plasticized protein pulp. The band of the fibrous protein-fat preparation is disintegrated into pieces and conditioned in water having a pH value of 6.7, at a temperature of 20° C., and then it is subjected to cooling in water at a temperature of 6° C. The textured milk proteins are passed through a binding solution in the form of egg-white, and then it is kept in water at a temperature of 75° C. for 1 minute, and cooled down to a temperature of 2° C., and finally it is frozen at a temperature of −18° C.

What is claimed is:

1. In the method of production of thermostable textured milk proteins from whole milk, partially skimmed milk, or skimmed milk subject to pasteurization at 72°–78° or at 90°–92° C., for 15–30 seconds, with the addition of calcium salts or calcium and calcium-phosphate salts, the improvement comprising cooling 5–25% by volume of the milk to be processed to a temperature of 40°–70° C.,; mixing the cooled milk with animal or vegetable fats, or a mixture thereof, and with emulsifiers permitted for food; homogenizing the emulsifier-milk-fat mixture; combining the homogenized mixture with the remaining portion amounting to 75–95% by volume of the milk to be processed; buffering the combined mixture by the addition of an acid selected from the group consisting of lactic, citric, acetic hydrochloric and phosphoric acids thereby causing a partial decalcification of particles of calcium phosphocaseinate, so as to maintain a level of calcium bond with the milk proteins of 0.35–0.8 mmol/1.g of protein, and admixing with food colors; enzymatically coagulating all the casein and milk albumins; disintegrating and reducing the water content of the coagulate to 70–80% by weight to form a pulp granulating the coagulate containing said facts; carrying out a preliminary texturation of the granulated pulp by thermal plasticization at 60°–80° C. in an acidified aqueous solution at a pH of 5.6–6.2 and twisting or vibrating the pulp; followed by the principal texturation thereof at 40°–60° C. by squeezing in a screw extruding press forcing through a nozzle and stretching; and disintegrating the obtained textured milk proteins into pieces of various sizes or forming into bodies of various shapes; conditioning the pieces in water at 14°–20° C. at a pH of 6.5 to 7.0 repeatedly in a continuous cycle; and freezing, lyophilizing or storing the finished textured milk protein whereby a textured protein product having the rheological properties and hydrogen ion concentration of beef is produced.

2. The method of claim 1, wherein the emulsifiers are selected from the group consisting of monoglyceride concentrates, vegetable phospholipides, and soya-bean lecithin.

3. The method of claim 1, wherein the fat is at least one member selected from the group consisting of lard, beef tallow, poultry lard, soya-bean oil, palm oil, coconut oil, and sunflower oil.

4. The method of claim 3, wherein the fat is used in an amount of 3% by volume in relation to the whole volume of milk to be processed.

5. The method of claim 1, wherein the homogenization of the milk-fat mixture is carried out at a temperature of 40°–70° C. and under a pressure of 100–170 atm.

6. The method of claim 1, wherein the food color is selected from the group consisting of cochineal from coccus cacti, alkanet from auchusa tinctoria, cocoa red from cocoa beans, lac from coccus lacca, orchil licheus, annato from bixa orellana, orange yellow S, tartrazin S, amaranth I, new kocein, cochineal red A, indigotine, caramel, onion skin extract, and mixtures thereof, in an amount of 0.1–0.8% by volume.

7. The method of claim 1, wherein polyphosphates are added to the acidified aqueous solution of the preliminary texturation step in amounts of 0.01–0.08% by weight.

8. The method of claim 1, wherein after the preliminary texturing there are added to the pulp being processed food colors, flavoring and perfuming substances, polyphosphates, carrageens, pectins, concentrates and isolates of vegetable and animal proteins, and vitamin concentrates.

9. The method of claim 1, wherein the formed or disintegrated textured milk proteins are conditioned in water at a temperature of 14°–20° C. in the course of 3–15 minutes, or in water containing 2–10% of domestic salt, at a temperature of 14°–20° C., and then in water at a temperature of 2°–6° C.

10. The method of claim 1, wherein the textured milk proteins, are passed continuously through a solution of a binding agent selected from the group consisting of eggwhites, calcium proteinate, calcium-sodium proteinate, egg albumins, and mixtures thereof.

* * * * *